United States Patent [19]

Wolken

[11] Patent Number: 4,669,832
[45] Date of Patent: Jun. 2, 1987

[54] LIGHT CONCENTRATING LENS SYSTEM

[76] Inventor: Jerome J. Wolken, 5817 Elmer St., Pittsburgh, Pa. 15232

[21] Appl. No.: 824,518

[22] Filed: Jan. 31, 1986

Related U.S. Application Data

[62] Division of Ser. No. 518,081, Jul. 28, 1983, abandoned.

[51] Int. Cl.⁴ .......................... G02B 17/08; G02B 3/00
[52] U.S. Cl. .................................... 350/413; 350/167; 350/443; 350/416
[58] Field of Search ........ 350/413, 435, 167, 432-434, 350/442, 443, 416; 126/440, 441

[56] References Cited

U.S. PATENT DOCUMENTS

| | | |
|---|---|---|
| 1,716,308 | 6/1929 | Foster . |
| 3,368,078 | 2/1968 | Flint et al. ............................ 250/216 |
| 3,535,015 | 10/1970 | Yevick et al. ......................... 350/18 |
| 3,592,525 | 7/1971 | Schultz ................................ 350/146 |
| 4,114,592 | 9/1978 | Winston ............................... 126/270 |
| 4,222,371 | 9/1980 | Heath .................................. 126/440 |
| 4,240,692 | 12/1980 | Winston ............................... 126/441 |
| 4,445,766 | 5/1984 | Yamazaki .............................. 354/79 |

OTHER PUBLICATIONS

Jerome J. Wolken et al, "The Eye Structure and Optical System of the Crustacean Copepod Copilia," The Journal of Cell Biology, 1969, vol. 40, No. 1, pp. 279–285.

Primary Examiner—Jon W. Henry
Attorney, Agent, or Firm—Arnold B. Silverman

[57] ABSTRACT

A prosthesis for visually handicapped persons provides for collection and concentration of available light to thereby assist the visually handicapped with seeing under conditions of reduced or diffuse lighting. The prosthesis has a pair of spaced tubular housing members each of which contains an imaging lens in the portion remote from the user's eye and a concentrating lens in spaced relationship from the imaging lens and closer to the user's eye than the imaging lens. The concentrating lens may be generally pear-shaped and have an entrance pupil of greater diameter than the exit pupil. The convex entrance surface may have a radius of curvature of about 1.8 to 2.2 times the radius of curvature of the convex exit surface. The intermediate lens surface may be generally parabolic in configuration. The concentrating lens is preferably substantially symmetrical about its longitudinal axis. The portion of the concentrating lens surrounded by the generally parabolic surface preferably has an axial extent of about 45 to 55 percent of the total axial length of the concentrating lens. The lens system is also usable in microsurgery, and cameras and a plurality of concentrating lenses may be employed in a solar collector.

6 Claims, 12 Drawing Figures

1

LIGHT CONCENTRATING LENS SYSTEM

This is a division of application Ser. No. 518,081 filed July 28, 1983 and now abandoned.

BACKGROUND OF THE INVENTION

1. Field of the Invention

The present invention relates to an improved lens system adapted for use in conditions of low or diffuse lighting, and, more specifically, relates to such a system which has a capability of collecting and concentrating the available light.

2. Description of the Prior Art

Various means have been known to assist individuals who are visually impaired. For example, millions of people employ corrective lenses in the form of contact lenses or eyeglasses in order to minimize or overcome a wide variety of problems.

With respect to people who are partially sighted the problem becomes more severe. It has been known to provide various forms of eyeglasses to provide some assistance to such individuals. It has also been known to provide single or multiple magnifying lenses in various sorts of holders to enlarge the image that the partially sighted would otherwise receive.

In spite of the foregoing prior art teachings, there is lacking any means for effectively assisting the partially sighted through a means which collects and concentrates the available light to thereby provide for improved vision under conditions of low or diffuse lighting.

There is also a need for improved lens systems adapted for improved low light performance in uses such as cameras and microsurgery and adapted for use in solar collectors.

SUMMARY OF THE INVENTION

The present invention has met the above-described needs by employing a unique combination of lenses fixedly secured within one or more housing members. The tubular housing members each have an imaging lens and a concentrating lens. The concentrating lens is designed to receive light and as a result of its unique geometric configuration, index of refraction and dimensions will serve to concentrate the light thereby improving the vision of the user. The invention is particularly suited to enhancing vision of a moving object under low or diffuse lighting conditions.

The invention has numerous advantageous uses including as a prosthesis for the partially sighted, in microsurgery, in cameras and in solar collectors.

It is an object of the present invention to provide apparatus in the nature of a prosthesis which will assist individuals with impaired vision in seeing under reduced light conditions.

It is a further object of the invention to provide a system which is adapted to gather light from the environment and concentrate the same.

It is another object of the present invention to provide such apparatus which is adapted for rapid scanning at relatively high resolution.

It is another object of the present invention to provide such apparatus which is of simple construction, economical to manufacture and easy to use.

It is a further object of the present invention to provide such apparatus which is adapted to provide increased contrast of the image even under low lighting levels.

It is a further object of the present invention to provide such a prosthetic devise for use by the visually handicapped in order to assist with viewing of moving objects under low or diffuse lighting conditions, such as television viewing, for example.

It is a further object of the invention to provide an efficient, low light lens system for a camera.

It is a further object of the invention to provide an improved solar collector employing concentrating lenses of the present invention.

These and other objects of the invention will be more fully understood from the following description of the invention on reference to the illustrations appended hereto.

DESCRIPTION OF THE PREFERRED EMBODIMENTS

Figure 1:
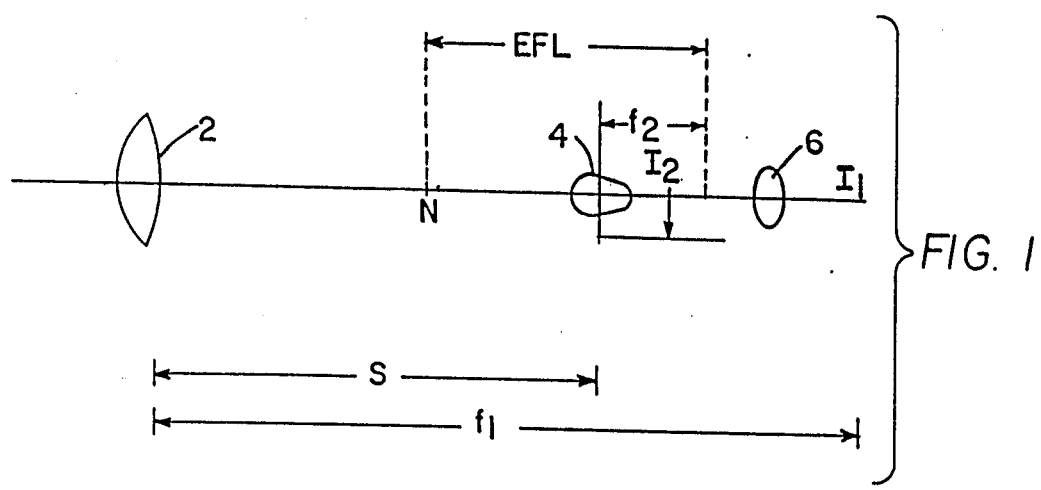
FIG. 1 is a schematic illustration showing a form of lens arrangement of the present invention.

Referring once again to FIG. 1 there is shown an imaging lens 2 and a concentrating lens 4, both of which would be supported within a suitable housing member (not shown in this view). Also shown in this view is the optional use of a further imaging lens 6 which would serve to magnify and/or invert the image created by lenses 2,4. The lens 2 has a focal point $I_1$ at a distance $f_1$ from the lens. Concentrating lens 4 is spaced from the imaging lens 2 a distance S which is less than $f_1$. Lens 4 is disposed closer to the eye of the user than imaging lens 2. Concentrating lens 4 has a focal point $I_2$. In general, it is preferred that all of these lenses 2, 4, 6 be made from materials selected from the group consisting of glass and synthetic polymeric resins. A suitable resinous material is acrylic.

Lens 2 may be of a circular configuration and preferably has a greater transverse extent than concentrating lens 4. In a preferred embodiment, concentrating lens 4 is of generally pear-shaped configuration with the larger transverse portion being closer to the imaging lens 2. Focal point $I_2$ is located at a distance $f_2$ from the optical center of the lens 4.

The nodal point of the combination of lenses 2, 4 has been indicated by the letter "N" and is found by drawing a line parallel to the original ray in passing through the final image. This line behaves much like a ray passing through a single lens positioned at N. The effective focal length (EFL) is the distance from N to $I_2$ and may be obtained from the equation:

$$EFL = \frac{f_1 \times f_2}{f_1 + f_2 - S}$$

where $f_1$ and $f_2$ are the focal lengths (in water) of lenses 2, 4 respectively, and S is the separation of the lenses measured from their axial centers.

Figure 2:
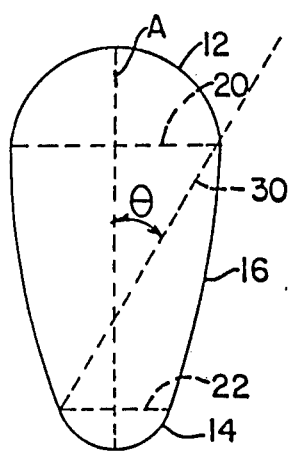
FIG. 2 is a schematic illustration showing a configuration of a light collecting lens of the present invention.
Figure 3:
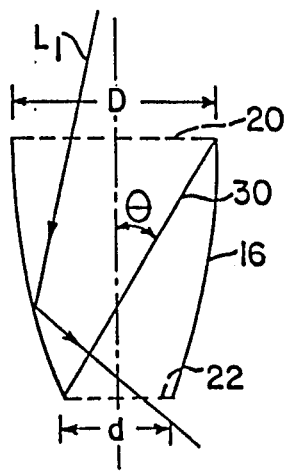
FIG. 3 is a schematic illustration showing a portion of the lens of FIG. 2.

Referring now to FIGS. 2 through 3, additional discussion of the preferred configuration of the parabolic lens 4 will be considered. As is shown in FIG. 2 the elongated, generally pear-shaped lens has a light receiving portion shown toward the upper end of FIG. 3 and a light exiting portion shown toward the lower end of FIG. 3. The entrance surface 12 is exteriorly convex and may be of spherical configuration with a radius of curvature of about 12.5 to 13.0 mm. The exit portion has an exit surface 14 which is exteriorly convex and may be generally spherical with a radius of curvature of about 6.0 to 6.5 mm. The lateral surface 16 connects surfaces 12 and 14 and is preferably of substantially parabolic configuration. A plane perpendicular to axis A cut through the lens generally where entrance surface 12 meets lateral surface 16 would establish the entrance pupil 20. This would be of substantially circular configuration. Similarly, a plane oriented generally transversely with respect to axis A passed through the lens generally where exit surface 14 meets lateral surface 16 would establish exit pupil 22 which would be generally circular in configuration.

It is preferred that the parabolic lens 4 be generally symmetrical with respect to the longitudinal center axis A. It is also preferred that the axial extent of the intermediate portion defined by lateral surface 16 be about 45 to 55 percent of the overall axial length of the lens. With reference to FIG. 3, it is seen that the entrance pupil 20 has a diameter "D" which is greater than the diameter "d" of the exit pupil 22. It is preferred that the ratio of "D" to "d" be about 1.8 to 2.2.

The size of lens 4 may vary depending upon the particular end use environment. In a prosthesis, for example, the overall axial extent of the lens 4 may preferably be about 19.125 mm to 19.375 mm.

The geometry of lens 4 is preferably such that a line extending from a point on the periphery of exit pupil 22 to a diametrically opposed peripheral point on entrance pupil 20 passing through the longitudinal axis A will form an input or acceptance angle theta which may be about 15 to 25 degrees and preferably about 19 to 24 degrees.

As is shown in FIG. 3, a light beam $L_1$ entering the lens 4 angularly will be caused to reflect before it emerges from the lens. Similarly, most angularly introduced light beams and a significant portion of axially introduced light beams will be reflected within the lens before emerging. As a result of the geometric shape of lens 4, light entering the lens is concentrated from the larger area 20 to the smaller area 22, i.e. at the exit area.

Figure 4:
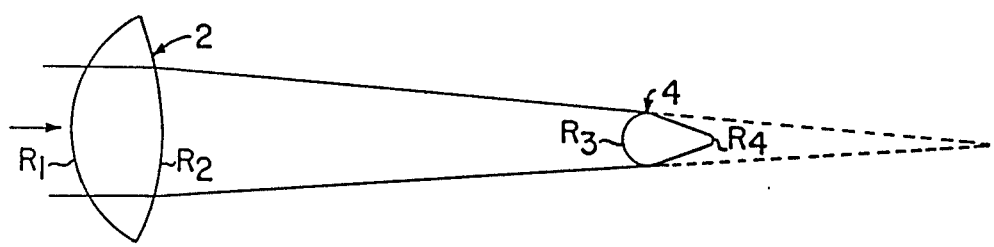
FIG. 4 is a schematic illustration of a lens system of the present invention.

With further reference to FIG. 4, the preferred geometric relationships between the opposed surfaces of lenses 2, 4 will be considered. With light impinging on the lens from the left in FIG. 4 in the direction of the arrow the front face of lens 2 will have a radius $R_1$ and the rear face will have a radius $R_2$. Radius $R_2$ will generally be about 1.0 to 4.0 times radius $R_1$ and preferably about 1.9 to 2.3 times radius $R_1$. Radius $R_3$ of the front face of lens 4 will generally be about 1.5 to 4.0 times radius $R_4$ of the rear face of lens 4 and preferably about 1.9 to 2.3 times $R_4$. These relationships contribute to the effectiveness of the system.

Lens 4 preferably has an index of refraction of about 1.4 to 1.6, although this may vary depending on whether a graded index of refraction of the lens material is employed. In one embodiment of the invention, in order to enhance light collection the entrance portion 12, 20 and an adjacent portion of the lateral section may be composed of a material having a first index of refraction and the exit portion 14, 22 and an adjacent portion of the lateral section may be composed of a material having a second index of refraction.

Figure 5:
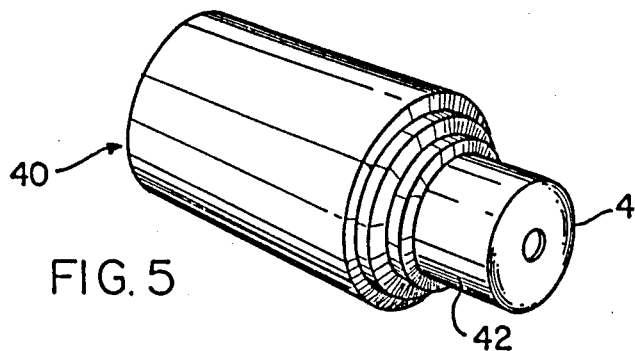
FIG. 5 is a perspective view of a form of housing member employable in the present invention.
Figure 6:
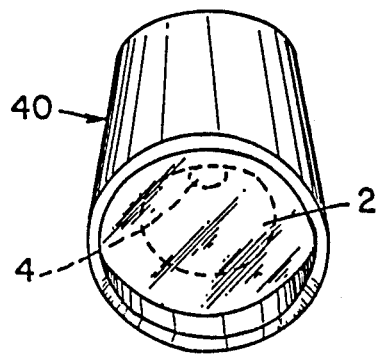
FIG. 6 is a perspective view showing a frontal portion of the housing of FIG. 5.
Figure 7:
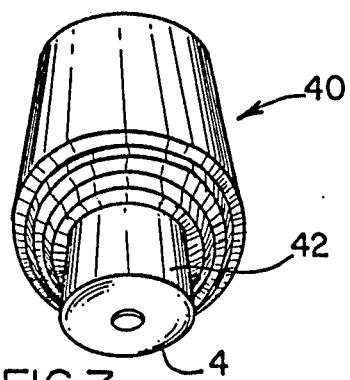
FIG. 7 is a perspective view showing a rear portion of the housing of FIG. 5.

Referring now to FIGS. 5 through 7, a form of housing member suitable for use with the present invention will now be considered. The housing member 40 is an elongated tubular member within which are secured the imaging lens 2 and the concentrating lens 4. A restricted diameter housing extension 42 is provided for securement of the concentrating lens 4. It will be appreciated that the generally cylindrical housing member will receive light through lens 2 which light will be passed through lens 4 and emerge therefrom into the eye of the user.

As an example of the housing sizes which might be appropriate for human use the large diameter portion of the housing member 40 may have a length of about 5.7 centimeters, and the enlarged diameter portion may have a diameter of about 3.5 centimeters.

Figure 8:
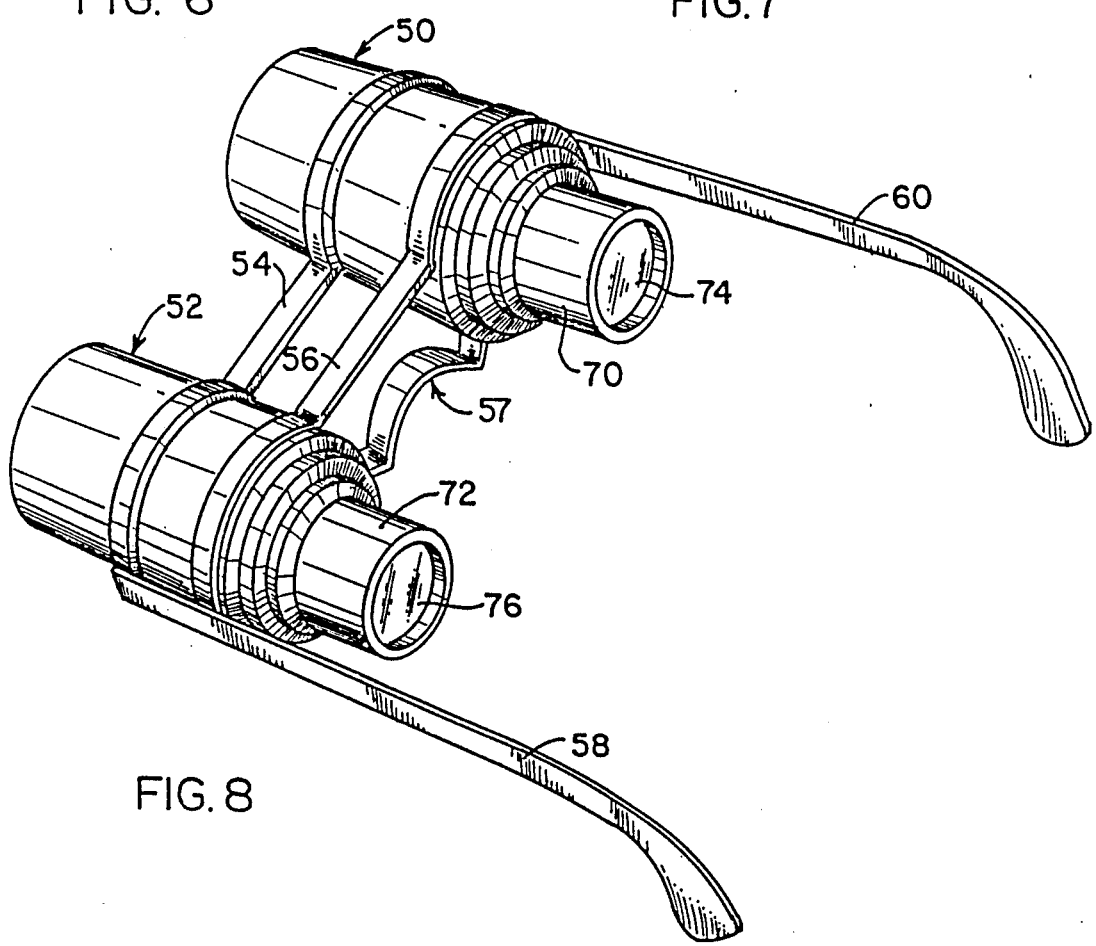
FIG. 8 is a perspective view of a form of prosthesis of the present invention.

Referring to FIG. 8, there is shown a prosthesis of the present invention adapted to be worn by a visually impaired human much in the manner that eyeglasses are worn. The housing members 50, 52 are secured in relatively fixed position by support members 54, 56 which are preferably substantially rigid and have a pair of end portions which circumferentially secure the housing members 50, 52 in position. In addition, a nose support 57 is secured between the housing members 50, 52 and has an underlying central recess which is adapted to engage the bridge of the nose. Ear supports 58, 60 are secured to support 54 and are adapted to be positioned in overlying supported relationship with respect to the individual's ears.

Cover members 70, 72 of FIG. 8 are provided, respectively with focusing screens 74, 76 for assisting with viewing the image of the lens system. These screens 74, 76 while not essential, may be a further imaging lens such as 6 in FIG. 1. They further serve to protect lens 4.

Figure 9:
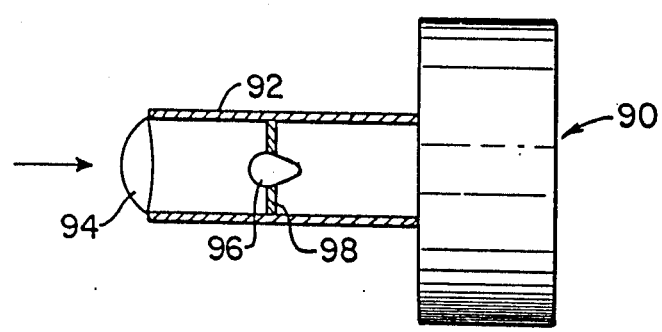
FIG. 9 is a partially broken away end elevational view of the lens system as employed in a camera.

Referring to FIG. 9 there is shown a lens system of the present invention as used in a camera. This lens system permits improved photography under low light conditions as the limited light is concentrated to permit increased film exposure. In the form illustrated, camera body 90 has a lens housing 92 secured to and operatively associated therewith. The imaging lens 94 is disposed closer to the free end of housing 92 than is concentrating lens 96 which is secured generally centrally within housing 92 by support 98. Support 98 is preferably an apertured, opaque circular disk which resists passage of light therethrough except through lens 96 which is secured within the aperture. Light will enter the camera from the direction indicated by the arrow. Lenses 94, 96 may have the same shape, properties and spacing as those described in connection with FIGS. 1 through 8. If desired, an additional imaging lens, such as lens 6 may be provided.

Figure 10:
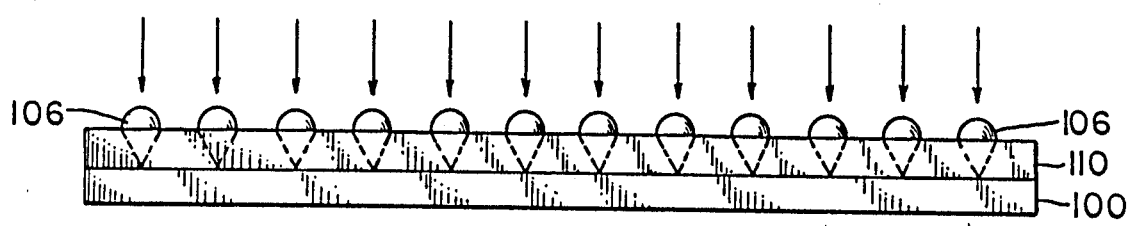
FIG. 10 is a front elevational view of a solar collector employing a plurality of concentrating lenses.
Figure 11:
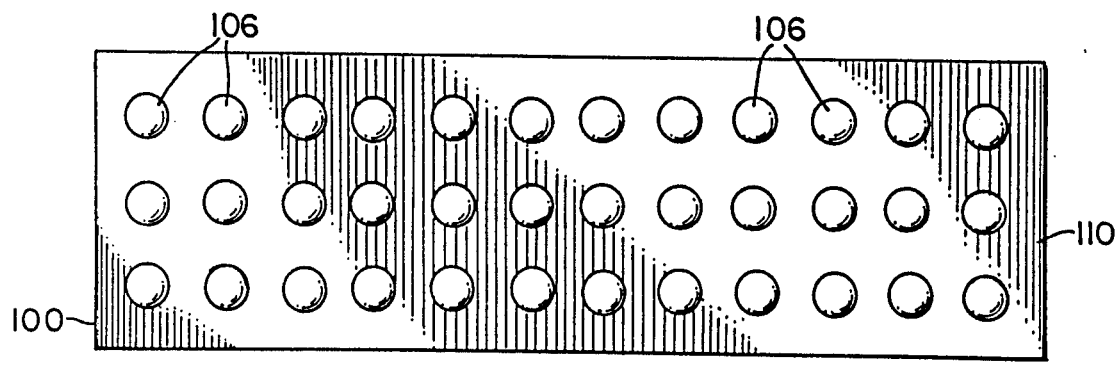
FIG. 11 is a top plan view of the solar collector of FIG. 10.

Another advantageous use of the present invention is illustrated in FIGS. 10 and 11. In this embodiment the concentrating lenses enhance the performance of solar collector systems. An array of concentrating lenses 106 are secured in spaced, generally parallel relationship with respect to each other and have their exit pupils facing a solar collector panel 100. In the form illustrated, the lenses 106 are shown in three parallel rows of twelve lenses. Lenses 106 are secured by any suitable support such as an apertured opaque plate 110 which may be supported by panel 100. Sunlight will enter the entrance surfaces of concentrating lenses 106 and be concentrated and delivered by the exit surfaces to panel 100 thereby enhancing efficiency of collection. The system may be constructed in modular fashion to permit flexibility of design.

Figure 12:
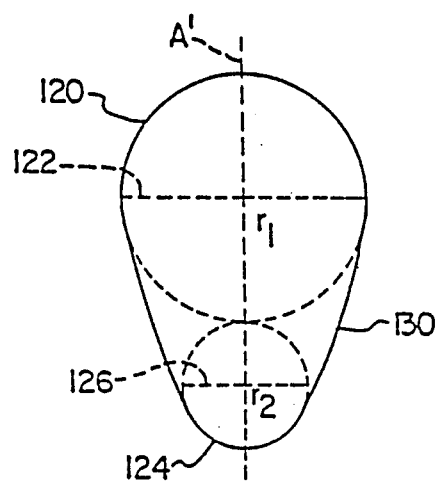
FIG. 12 is a schematic illustration showing a configuration of the light collecting lens of the present invention.

FIG. 12 illustrates a view of light collecting lens of the present invention which has the preferred relationships. More specifically, the lens is generally similar to that shown in FIG. 2 except for certain modifications in dimension. The lens has a central longitudinal axis A', an entrance surface 120, an entrance pupil 122, an exit surface 124 with an exit pupil 126 and a lateral surface 130 connecting surfaces 120 and 124. In the embodiment shown in FIG. 12, as the upper circle has a radius $r_1$ and the lower circle has a radius $r_2$, the axial extent of the portion intermediate entrance pupil 122 and exit pupil 126 would fall within the preferred range of being about 45 to 55 percent of the overall axial extent of the lens.

While for convenience of reference herein the visual aid shown in FIG. 8 has been described in terms of its use as a prosthesis for the partially sighted, it may also be employed to assist a surgeon in microsurgery and such use is expressly contemplated.

It will be appreciated that the prosthesis of the present invention provides as a result of the combination of the imaging lens and the unique concentrating lens and relative positioning thereof an effective means for a visually handicapped person to improve vision in low light or diffuse light situations (such as in watching television) while providing high resolution. All of this is accomplished in an efficient and economical manner which makes the system economical to provide and easy to use. Similarly, advantageous use in microsurgery, cameras and solar collectors is provided for.

Whereas particular embodiments of the invention have been described above for purposes of illustration, it will be appreciated by those skilled in the art that numerous variations of the details may be made without departing from the invention as described in the appended claims.

I claim:
1. A solar collector comprising
   a solar collector panel,
   a plurality of concentrating lens disposed adjacent said panel in relative spaced relationship with respect to each other,
   said concentrating lens being generally pear-shaped,
   said concentrating lenses having a generally convex entry end and a generally convex exit end,
   said entry end radius of curvature of said concentrating lenses being about 1.5 to 4.0 times the radius of curvature of said exit end surface, and
   said exit end surfaces facing said solar collector panel.
2. The solar collector of claim 1 including
   said lenses being arranged in a series of generally parallel rows.
3. The solar collector of claim 1 including
   said concentrating lenses having lateral connecting surfaces connecting said entry end surface with said exit end surface, and
   said lateral surface being substantially parabolic.
4. The solar collector of claim 3 including
   said concentrating lens being substantially symmetrical about its longitudinal axis.
5. The solar collector of claim 4 including
   said lenses each having graded indices of refraction.
6. The solar collector of claim 4 including
   the axial extent of the portion of said lenses surrounded by said parabolic surface being about 45 to 55 percent of the total axial extent of said concentrating lens.

* * * * *